(12) United States Patent
Zettner

(10) Patent No.: US 9,638,035 B2
(45) Date of Patent: May 2, 2017

(54) ROTARY ENGINE AND PROCESS

(71) Applicant: TRIPLE E POWER LTD, Be'er Sheva (IL)

(72) Inventor: Michael Zettner, Gan-Yavne (IL)

(73) Assignee: TRIPILE E POWER LTD., Be'er Sheva (IL)

( * ) Notice: Subject to any disclaimer, the term of this patent is extended or adjusted under 35 U.S.C. 154(b) by 176 days.

(21) Appl. No.: 14/356,952

(22) PCT Filed: Nov. 15, 2012

(86) PCT No.: PCT/IL2012/050459
§ 371 (c)(1),
(2) Date: May 8, 2014

(87) PCT Pub. No.: WO2013/072913
PCT Pub. Date: May 23, 2013

(65) Prior Publication Data
US 2014/0325986 A1    Nov. 6, 2014

(30) Foreign Application Priority Data

Nov. 17, 2011  (IL) .......................................... 216439

(51) Int. Cl.
*F01C 1/20*    (2006.01)
*F01C 20/14*   (2006.01)
(Continued)

(52) U.S. Cl.
CPC .............. *F01C 1/20* (2013.01); *F01C 11/004* (2013.01); *F01C 20/14* (2013.01); *F02G 1/05* (2013.01);
(Continued)

(58) Field of Classification Search
CPC ...... F01C 1/14; F01C 1/18; F01C 1/20; F01C 1/28; F01C 1/123; F01C 1/36;
(Continued)

(56) References Cited

U.S. PATENT DOCUMENTS

| 105,708 A | 7/1870 | Mead |
|---|---|---|
| 137,065 A | 3/1873 | Fisher |

(Continued)

FOREIGN PATENT DOCUMENTS

| CN | 2079219 U | 6/1991 |
|---|---|---|
| CN | 2558773 Y | 7/2003 |
| GB | 913 | 0/1769 |

OTHER PUBLICATIONS

International Preliminary Report on Patentability for PCT/IL2012/050459; mailed on May 30, 2014; 8 pages.

(Continued)

*Primary Examiner* — Thai Ba Trieu
*Assistant Examiner* — Xiaoting Hu
(74) *Attorney, Agent, or Firm* — Roach Brown McCarthy & Gruber, P.C.; Kevin D. McCarthy

(57) ABSTRACT

The invention is a rotary engine comprised of at least one and usually a plurality of independent partial engines. Two different processes can be carried out in each independent partial engine both of which are used to operate the engines. The processes of the invention are basically two different and separate closed cycle processes that can both operate within the same geometric confinement, i.e. the same expansion chamber or expansion chambers, at the same time. The primary process performs the main function of converting heat to kinetic energy and is necessary in all engines of the invention. It is a unique process that uses the expansion of gases and also the contraction of the condensing gases after their expansion. The secondary process is needed for start- (Continued)

up and to provide additional power in case the engine might go into a stall. In most engines of the invention both processes are needed to operate the engine.

14 Claims, 9 Drawing Sheets

(51) Int. Cl.
*F01C 11/00* (2006.01)
*F02G 1/05* (2006.01)
*F01C 21/00* (2006.01)
*F04C 29/12* (2006.01)
*F01C 21/18* (2006.01)

(52) U.S. Cl.
CPC .......... *F01C 21/18* (2013.01); *F01C 2021/12* (2013.01); *F02G 2254/30* (2013.01); *F02G 2270/90* (2013.01); *F04C 29/124* (2013.01); *Y02E 10/46* (2013.01)

(58) Field of Classification Search
CPC F01C 21/18; F01C 2021/12; F01C 2021/125; F01C 2021/14; F01C 20/14; F01C 20/10; F04C 2/14; F04C 2/18; F04C 2/20; F04C 18/14; F04C 18/18; F04C 18/20; F04C 15/064; F04C 29/124; F02G 1/05; F01K 9/003; F01K 17/02; F01K 17/06
See application file for complete search history.

(56) References Cited

U.S. PATENT DOCUMENTS

| 274,478 | A | * | 3/1883 | Forbes | F01C 1/20 418/105 |
|---|---|---|---|---|---|
| 562,405 | A | | 6/1896 | Kryszat | |
| 571,377 | A | * | 11/1896 | Kryszat | F04C 2/14 418/196 |
| 639,394 | A | * | 12/1899 | Hutin et al. | F22B 35/105 180/56 |
| 744,614 | A | | 11/1903 | Rice | |
| 759,571 | A | * | 5/1904 | Suiter | F04C 2/14 418/10 |
| 889,583 | A | * | 6/1908 | Cleveland | F04C 2/14 418/196 |
| 904,749 | A | | 11/1908 | Bender | |
| 1,333,176 | A | | 3/1920 | Dyer | |
| 1,766,519 | A | * | 6/1930 | Johnson | F01C 1/20 418/196 |
| 1,782,766 | A | * | 11/1930 | Randolph | F01C 1/20 418/105 |
| 2,152,564 | A | | 3/1939 | Perkins | |
| 2,390,880 | A | * | 12/1945 | Harrold | F01C 1/20 418/196 |
| 2,454,006 | A | | 11/1948 | Plummer | |
| 2,463,155 | A | * | 3/1949 | Dawes | F01C 1/3442 418/103 |
| 2,950,592 | A | * | 8/1960 | Frank | F02K 7/06 431/1 |
| 3,307,489 | A | * | 3/1967 | Eckerle et al. | F01C 1/18 418/126 |
| 3,780,710 | A | | 12/1973 | Przybylski | |
| 3,865,522 | A | * | 2/1975 | Nardi | F01C 21/18 418/161 |
| 4,055,050 | A | * | 10/1977 | Kozlov | F01K 9/003 60/652 |
| 4,512,302 | A | | 4/1985 | Bunce | |
| 4,590,761 | A | | 5/1986 | Zettner | |
| 4,890,990 | A | | 1/1990 | Zettner | |
| 5,039,290 | A | | 8/1991 | Nardi | |
| 6,550,443 | B1 | | 4/2003 | Vanmoor | |
| 7,549,412 | B2 | | 6/2009 | Singh | |
| 2003/0215346 | A1 | * | 11/2003 | Lurtz | F01C 1/14 418/227 |
| 2012/0288391 | A1 | * | 11/2012 | Davis | F01C 1/22 418/1 |

OTHER PUBLICATIONS

International Search Report for PCT International application No. Il2012/050549, two pages, mailed Mar. 17, 2013.
Wikipedia steam engines; http://en.wikipedia.org/wiki/Steam_engine; posted Dec. 21, 2011, 18 pages.

* cited by examiner

ROTARY ENGINE AND PROCESS

FIELD OF THE INVENTION

The invention is from the field of engines. Specifically the invention is from the field of processes for converting heat energy into kinetic energy and engines designed to operate using these processes.

BACKGROUND OF THE INVENTION

An engine is a device or machine whereby using a specific process, energy is transformed from one form, i.e. thermal energy or heat, to another form. i.e. kinetic energy.
Relevance of Efficiency The efficiency of such a process and the device or machine to realise the process is of importance because engines are used in such large numbers worldwide that they have an influence on world climate and therefore inefficiency poses a real threat to nature and thus mankind. Also the cost factor for creating kinetic energy from heat energy is an important factor in an economy thus the efficiency of such processes is important.
Using Evaporation of Liquids Most liquids can evaporate. By heating the liquid beyond its specific evaporation-temperature the liquid changes from a liquid state to a gaseous state. In the gaseous state the fluid is commonly called gas, steam or vapour depending on the type of liquid.

Each liquid has its specific evaporation temperature for ambient or standard-condition often referred to as 'STP'. One of the most common standard conditions are 25 degrees Centigrade and 100 kPa (=1 bar). Under standard conditions one liter of water will evaporate to 1,673 liters of steam. If 1,673 liters of steam condenses and forms the liquid state of water, the volume will be reduced to one single liter—about 1600 times less.

A process of evaporation of water will start under standard condition of 100 kPa at 100 degrees Centigrade. If the pressure is higher the process of evaporation will start at a proportionally higher temperature. For each pressure there is a specific temperature at which evaporation takes place. The value of this temperature can be looked up in specific steam tables for water and many other fluids. Water for example remains a liquid at 200 degrees Centigrade when the pressure is at or above 1,512 MPa.

When a liquid changes from the liquid state to the gaseous state additional energy has to be supplied for the evaporation process that is not used to increase the temperature but to enable the molecules to separate and form a gas. This energy, which is referred to as "evaporation heat" or "latent heat" because it doesn't heat the liquid, has a different specific value for each liquid. For water it is 2,257 kJ per kg water.

In order to produce (dry) steam with a temperature of 200 degrees Centigrade it is necessary to supply the energy needed for the increase of temperature, i.e. around 735 kJ per kg water, plus the energy for the evaporation heat, i.e. 2,257 kJ per kg water. From the total amount of energy that had been added to the water to produce steam of 200 degrees Centigrade only 24.5% of the energy in the hot steam can be used when the hot steam cools down. 75.4% cannot be released in the form of heat. The same calculation for steam with a temperature of 800 degrees Centigrade needs 3,255 kJ per kg water plus the 2,257 kJ for the evaporation heat. Together this is 5,512 kJ per kg water. In this case around 60% of the heat that had been introduced into the water can be used. In both cases the same amount of energy for the evaporation has been added.

But in the second case the percentage that can be used is higher due to a higher end-temperature. Therefore steam processes like turbines in power stations that use the Rankine process use the highest possible temperature of the steam in order to achieve better efficiencies.

If an engine can use the pressure of the process fluid, e.g. in the case of a steam engine or steam turbine, the pressure of the steam that enters the expansion chamber until complete expansion, it can use only use the percentage of the heat that does not include the evaporation heat. For lower temperatures as in the example above shown 75% of the heat energy in the process fluid is lost because in engines or turbines known today the enthalpy of condensation cannot be transformed in the process into kinetic energy. This loss is in addition to mechanical and other losses. It is for this reason that the Rankine process or Clausius-Rankine process, which are used today for most engines that work with a heated process fluid or steam, are operated at the highest possible starting temperature to keep the percentage of the amount of the (lost) heat of vaporisation as low as possible.
The Term "Engine"

As used herein the term "engine" is used to describe a device as hardware that is designed to allow one or more specific processes that are unique for the purpose of transforming energy from one form to another to be realised. All known engines today—with the possible exception of the "Six-stroke engine"—are based upon and only use one single process to transform thermal energy into kinetic energy.
Engine Design There is a fundamental difference between a specific process and the hardware design of an engine. This becomes clearer with the example of the internal combustion engine using the four-stroke process, as is commonly used today in most cars. The four-stroke process is in most cases realised in a piston engine, but it can also be realised in a Wankel rotary engine. Thus there is the same process but two fundamentally different designs of the engines. The opposite is also true. In piston engines different processes can be realised. For example consider the Lenoir gas engine with a two stroke process without compression, the four stroke process with compression, and as realised in the six-stroke engine (The development of piston engines over the years can be followed in the patent literature by considering, for example, U.S. Pat. No. 1,333,176 to L. H. Dyer from 1920 and U.S. Pat. No. 7,549,412 to S. Singh from 2006) also as a combination of a uniflow-steam-engine-process with a conventional four-stroke-engine process. From this it is clear that a new engine-process can be realised in existing engine concepts or designs.
Rotary Engines Nearly all rotary engines share their basic design with rotary lobe or rotary piston gear pumps. These kinds of pump come in many variations and most of these variations can also be used for an engine design. The patent U.S. Pat. No. 904,749 to C. A. Bender from the year 1908 shows such a design that is used as a steam engine. In Bender's engine steam is expanded in a bent cuboid expansion chamber that is closed at its two face-sides by small rotors with a recess to allow a rotor blade that acts as a piston to pass through this recess. In many other similar rotary engines the task of allowing the continuous creation of closed expansion chambers is carried out by radially moving flaps that open and close to move into and out of the path of the piston-like rotor blade. There are many more similar designs—probably several thousands—for either steam engines or also other forms of engines, pumps and compressors.

It is a purpose of the present invention to provide a new process for converting thermal energy to kinetic energy with very high efficiency.

It is another purpose of the present invention to provide engines that are designed to operate using the new process for converting thermal energy to kinetic energy with very high efficiency.

Further purposes and advantages of this invention will appear as the description proceeds.

SUMMARY OF THE INVENTION

In a first aspect the invention is a rotary engine comprised of at least one independent partial engine adapted to perform a primary process. Each partial engine comprising:
a) a cold reservoir containing a process fluid in the liquid state;
b) a pump adapted to pressurize the liquid process fluid;
c) a heater system adapted to receive pressurized liquid process fluid from the pump and to heat the pressurized liquid process fluid;
d) a hot reservoir adapted to store overheated pressurized process fluid received from the heater system;
e) an expansion chamber having an entrance and exit side, the expansion chamber adapted to allow rotor blades to move through it, the rotor blades attached to a main rotor, which is attached to an output shaft of the engine;
f) two closing mechanisms that define the entrance and exit sides of the expansion chamber, wherein the first of the closing mechanisms is located before a primary inlet opening that allows process fluid to enter the expansion chamber and the second of the closing mechanisms is located after a primary outlet opening that allows the expanded gases of the process fluid to exit the expansion chamber; the closing mechanisms are adapted to trap batches of process fluid within the expansion chamber while allowing the rotor blades to pass from one expansion chamber into a following expansion chamber;
g) a primary inlet valve in fluid communication with the primary inlet opening of the expansion chamber and adapted to receive the overheated pressurized process fluid from the hot reservoir and to allow a series of batches of the overheated pressurized process fluid of predetermined volume to enter the expansion chamber; and
h) a primary outlet valve in fluid communication with the primary outlet opening of the expansion chamber and adapted to allow the gas phase of the process fluid to leave the expansion chamber and to return to the cold reservoir, wherein the gas phase process fluid condenses to the liquid state.

The batch of the overheated pressurized process fluid transforms into the gas phase of the process fluid after it is allowed to enter the expansion chamber by the primary inlet valve. The resulting gas exerts a pressure on the back side of the rotor blade causing the rotor blade to move through the expansion chamber.

According to the invention the volume of the batch of the overheated pressurized process fluid allowed to enter the expansion chamber by the primary inlet valve is determined such that when the batch of the overheated pressurized process fluid is transformed into the gas phase the volume of the fully expanded gas phase process fluid will be equal to the volume of the expansion chamber.

In the engine of the invention the primary inlet valve opens when the rotor blade passes the inlet opening to the expansion chamber and closes after the batch of the overheated pressurized process fluid is allowed to enter the expansion chamber.

In the engine of the invention the primary outlet valve opens when the rotor blade passes the inlet opening of the expansion chamber and closes when the rotor blade approaches the outlet opening to the expansion chamber. This allows negative pressure created by the condensation of the gas phase process fluid in the cold reservoir to act, at the same time as the pressure of the expanding gas pushes on the back side of the rotor blade, on the front side of the rotor blade.

In embodiments of the rotary engine of the invention that comprise more than one partial engine, the expansion chambers of the partial engines are located one next to the other distributed around the circumference of the rotational engine.

In embodiments of the rotary engine of the invention the heater system is adapted to allows quasi continuous burning of fluids at very high temperatures by using controlled continuous pulsing explosions or detonations In embodiments of the rotary engine of the invention the heater system comprises a solar heater.

The opening and closing of the primary inlet valve and the primary outlet valve of the rotational engine of the invention are mechanically synchronized with the rotation of the main rotor.

In embodiments of the rotary engine of the invention the closing mechanisms are small rotors. The rotation of the small rotors, the opening and closing of the primary inlet valve and the primary outlet valve are mechanically synchronized with the rotation of the main rotor.

Embodiments of the rotary engine of the invention comprise a heat exchanger located at the cold reservoir. The heat exchanger is adapted to take a part of the heat energy the gas phase process fluid entering the cold reservoir and the warm condensed process fluid in the cold reservoir and using the heat energy to preheat the fuel of the heater system, thereby keeping the temperature level in said cold reservoir below a maximum temperature.

Embodiments of the rotary engine of the invention comprise a configuration comprised of several parallel disks. Each disk comprises a rotor and several partial engines. The expansion chambers of each of the partial engines are located one next to the other distributed around the circumference of each rotor and the rotors of all of the discs are connected to a common output shaft.

In embodiments of the rotary engine of the invention each expansion chamber comprises at least one secondary inlet valve in fluid communication with a secondary inlet opening into the expansion chamber and at least one secondary outlet valve in fluid communication with a primary outlet opening into the expansion chamber. This makes it possible to perform a secondary process parallel to the primary process at the same time and in the same expansion chamber.

In embodiments of the rotary engine of the invention comprising secondary inlet and outlet valves the inlets and outlets of the primary and the secondary processes to the expansion chamber are aligned roughly in parallel at the same circumferential position relative to the closing mechanisms to optimize the space needed for them and to admit process fluid from both processes into the expansion chamber at the same location and to allow expanded gas to escape from the expansion chamber at the same location.

In embodiments of the rotary engine of the invention comprising secondary inlet and outlet valves the secondary inlet valve and secondary outlet valve are not connected to or synchronised with the primary inlet valve, the primary outlet valve, or the main rotor and the valves of the primary and secondary processes are opened and closed independently of each other.

The secondary process is initiated to prevent stalling of the primary process, for example when there is a sudden power demand on the engine and/or during the start-up process of the engine.

Embodiments of the rotary engine of the invention can be made from thermoplastic material.

In a second aspect the invention is a process for a rotary engine. The process comprises the steps of:
  a) activating a pump adapted to pressurize liquid process fluid from a cold reservoir;
  b) activating a heater system adapted to receive pressurized liquid process fluid from the pump and to heat the pressurized liquid process fluid;
  c) activating an inlet valve located at an inlet opening of an expansion chamber to allow a series of batches of predetermined volume of overheated pressurized process fluid to enter the expansion chamber, wherein the batches of the overheated pressurized process fluid transform into the gas phase of the process fluid and wherein the inlet valve is activated to open at a time when the gas will exert a positive pressure on the back side of a rotor blade causing the rotor blade to move through the expansion chamber;
  d) activating an outlet valve located at an outlet opening of the expansion chamber such that the outlet valve opens when a rotor blade passes the inlet opening to the expansion chamber whereupon a first batch of overheated pressurized process fluid enters the expansion chamber and the outlet valve closes when the rotor blade approaches the outlet opening to the expansion chamber.

Activating the outlet valve at these times causes the fully expanded gas phase of the first batch of process fluid to remain in the expansion chamber until after the next following rotor blade passes into the expansion chamber, whereupon a second batch of overheated pressurized process fluid enters the expansion chamber and, only then, allows the fully expanded gas phase of the first batch of process fluid to return to the cold reservoir, wherein the gas phase of the first batch process fluid condenses to the liquid state. Since the outlet valve is open the negative pressure created by the condensation acts on the front side of the next rotor blade at the same time as the pressure of the expanding gas of the second batch of process fluid pushes on the back side of the next rotor blade. In this way both, the energy stored in the gas phase of the batches of process fluid and also the condensation enthalpy is used to move the rotor blades.

All the above and other characteristics and advantages of the invention will be further understood through the following illustrative and non-limitative description of embodiments thereof, with reference to the appended drawings. In the drawings the same numerals are sometimes used to indicate the same elements in different drawings.

DETAILED DESCRIPTION OF EMBODIMENTS OF THE INVENTION

The invention is a rotary engine comprised of at least one and usually a plurality of independent partial engines. Two different processes can be carried out in each independent partial engine both of which are used to operate the engines.

The processes of the invention are basically two different and separate closed cycle processes that can both operate within the same geometric confinement, i.e. the same expansion chamber or expansion chambers, at the same time. The primary process performs the main function of converting heat to kinetic energy and is necessary in all engines of the invention. The secondary process is needed for start-up and to provide additional power in case the engine might go into a stall. In most engines of the invention both processes are needed to operate the engine.

The Primary Process

The primary process is based on the change of process fluid from a liquid to a gaseous state and back as it moves around the engine in a closed cycle. Similar to identical cylinders in a conventional four-stroke combustion engine with a radial design, the engine of the invention is comprised of several identical partial engines each having its own expansion chamber in which separate individual closed process cycles take place. The expansion chambers of the partial engines are in series—one next to the other distributed around the circumference of the rotational engine.

Figure 1:
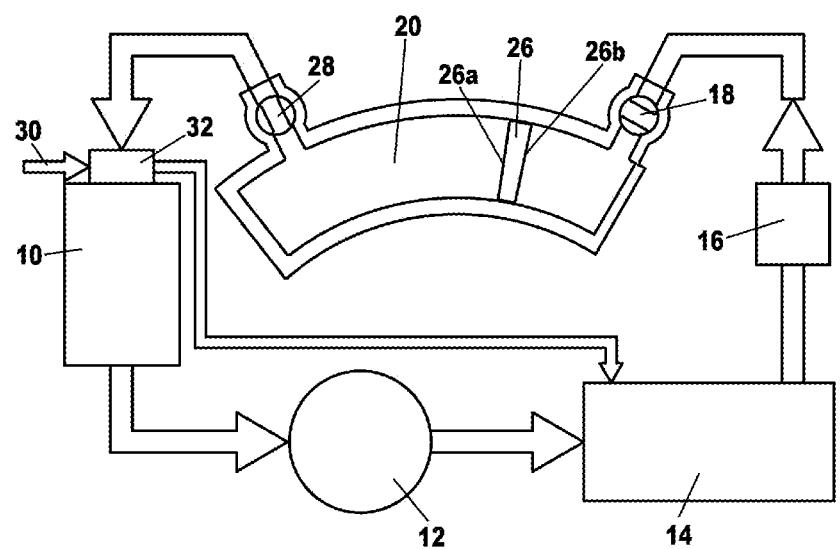
FIG. 1 schematically shows the basic components associated with the primary process for each expansion chamber in an engine of the invention.

Each of the independent partial engines in the engine of the present invention has its own specific expansion chamber, its own specific cold-reservoir, hot reservoir, primary inlet valve and primary outlet valve and other basic components that are schematically shown in FIG. 1.

One single primary cycle of one of the independent partial engines that work together in series to make up the rotary engine of the invention is described now: A pump 12 receives process fluid from the cold reservoir 10 and pressurises it to the highest pressure that the primary cycle requires for running. The stream of pressurised process fluid is led to the heater system 14. The heater system 14 can be of many different types of arrangement for heating the process fluid, e.g. a burner, a boiler, or a solar heater. A particularly suitable embodiment of burner 14 for use in the engines of the present invention is one that is described in published PCT application WO 2011/070580 or the US corresponding application which is U.S. published patent application number 20120264070, which is incorporated by reference, to the inventor of the present invention because, among other reasons, it has a very high efficiency. As described in the abstract of both WO 2011/070580 and US 20120264070, the burner operates "by using controlled continuous pulsing explosions or detonations" to allow 'quasi continuous burning' of fluids' at temperatures high enough to ignite the fluids.

From the heater system 14 the now overheated pressurised process fluid moves as a fluid or as a supercritical fluid into the hot reservoir 16. The hot reservoir is preferably located close to the inlet of the expansion chamber 20. From the hot reservoir 16 the overheated pressurised process fluid goes to the rotating inlet valve 18. The rotating inlet valve takes only a specific limited amount of the overheated pressurised process fluid and allows it to pass into the expansion chamber 20. One or more cavities or recesses in the inlet valve 18, with a specific size, function like one or several graduate beakers and allow only the precise amount of overheated pressurised process fluid into the expansion chamber that corresponds with total expansion of the then formed gas, steam or vapour inside the expansion chamber. Thus the rotating inlet valve creates or defines work-cycles, i.e. it lets in a batch, i.e. a precise amount of overheated pressurised process fluid, into the expansion chamber 20 and then interrupts the flow after which it lets in another batch, etc.

Inside the expansion chamber 20 the overheated pressurized process fluid is able to transform from a fluid into a gas, steam or vapour due to the larger volume of space available and thus the consequent drop of pressure. The drop of pressure is caused firstly by the larger volume of space inside the expansion chamber 20 and secondly by the continuously increasing volume of the expansion chamber 20 due to the movement of the rotor blade 26.

The expansion chamber 20 has a bent cuboid form and is defined by walls that are all static or fixed except for the rotor blade 26 that is connected to the main rotor and moves through expansion chamber 20 as the main rotor rotates. As the gas expands in the chamber it pushes on and moves the rotor blade 26, as the rotor blade 26 moves the rotor to which the rotor blade is connected also moves, thus providing the output from the engine.

The sequence of opening and closing of the primary inlet valve 18 and primary outlet valve 28 of expansion chamber 20 is schematically shown in FIG. 2A to FIG. 2F. The expansion chamber 20 shown in FIG. 1 is one of a plurality of expansion chambers of the partial engines that surround the main rotor of the circular engine. In FIG. 2A to FIG. 2F are shown two complete adjacent expansion chambers $20_i$ and $20_{i+1}$ and parts of more expansion chambers. The entrance and exit sides of each bent cuboid expansion chamber are each defined by a closing mechanism. In the circumferential direction the expansion chamber is configured as follows: on the entrance side a closing mechanism is located before an inlet opening that is adapted to allow the process fluid to enter the expansion chamber; spaced apart from the entrance side is the exit side comprising an outlet opening that is adapted to allow the process fluid to exit the expansion chamber; located after the outlet opening is located another closing mechanism.

The closing mechanisms are adapted to trap batches of process fluid within the expansion chamber while allowing a rotor blade to pass from one expansion chamber into a following next expansion chamber. For illustrative purposes closing mechanisms are described as small rotors 22. An alternative closing mechanism could be radially moving flaps. Each small rotor 22 has at least one recess, which the rotor blades 26 can move into and out of, thereby allowing the rotor blades to pass from expansion chamber into the neighbouring one.

The main rotor 24, to which rotor blades 26 are attached, is connected through an assembly of gears to the small rotors 22, the primary inlet 18, and primary outlet 28 valves of the partial engine so that the rotations and thus opening and closing of the primary inlet valve 18 to allow a batch of supercritical process fluid into expansion chamber 20 and the opening and closing of the primary outlet valve 28 to allow the fully expanded gas to be connected to the cold reservoir and thus, as will be discussed herein below, create a vacuum that applies on the front side of the rotor blade 26a, are mechanically synchronized with the rotation of the rotor.

In FIG. 2A to FIG. 2F main rotor 24 rotates in a counter clockwise direction and successive similar parts are identified by subscripts. The tolerances to which the parts of the engine of the invention are manufactured are such that the contact between the surface of the main rotor 24 and the surfaces of the small rotors 22 as they roll over each other form a sufficient airtight seal preventing significant leakage of gas between adjacent expansion chambers.

Figure 2A:
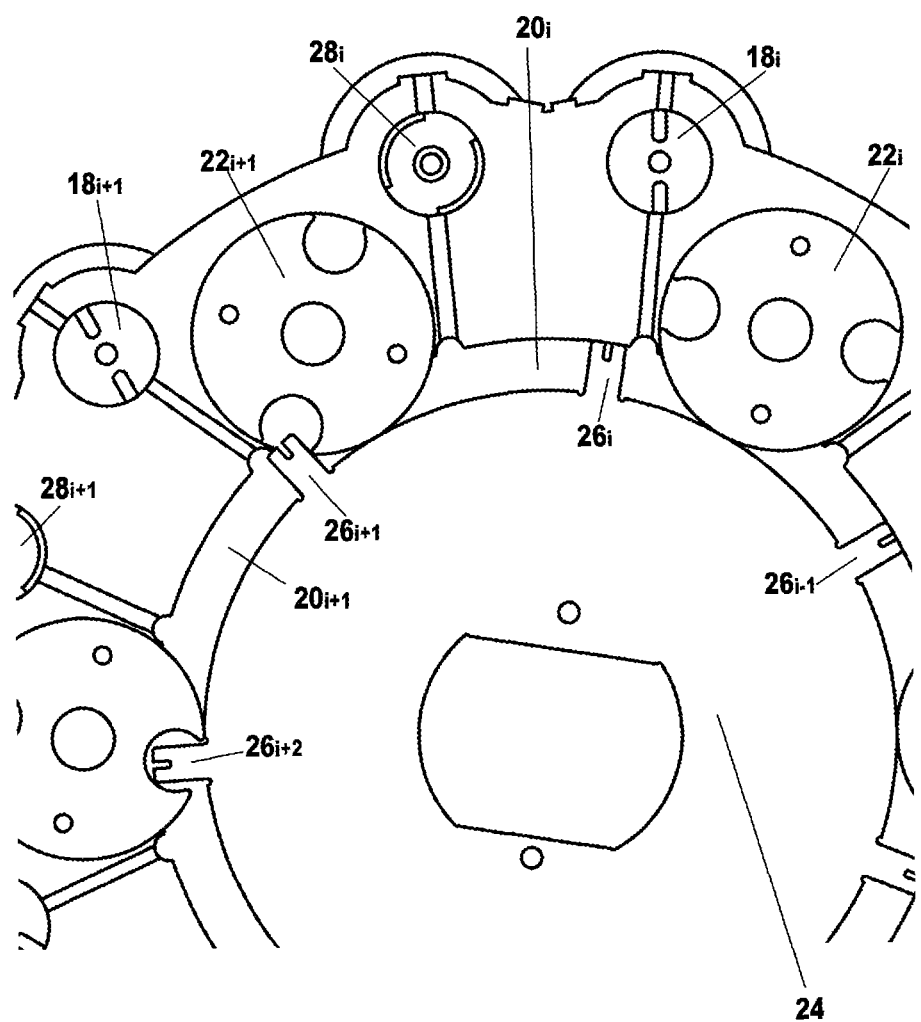
FIG. 2A to FIG. 2F schematically show the sequence of opening and closing of the primary inlet valve and primary outlet valve of an expansion chamber in an engine of the invention.

FIG. 2A shows the relative orientation of the parts of the engine just after a batch of supercritical process fluid has entered process chamber $20_i$ into the space between small rotor $22_i$ and rotor blade $26_i$. At this stage primary inlet valve $18i$ is just beginning to close and primary outlet valve $28_i$ of expansion chamber $20_i$ is just starting to open to allow the fully expanded gas or steam phase from the previous batch of process fluid, which is confined in expansion chamber $20i$ between rotor blades $26_i$ and small rotor $22_{i+1}$ to be connected to the cold reservoir and thus create a vacuum that applies on the front side of the rotor blade $26_i$.

Figure 2B:
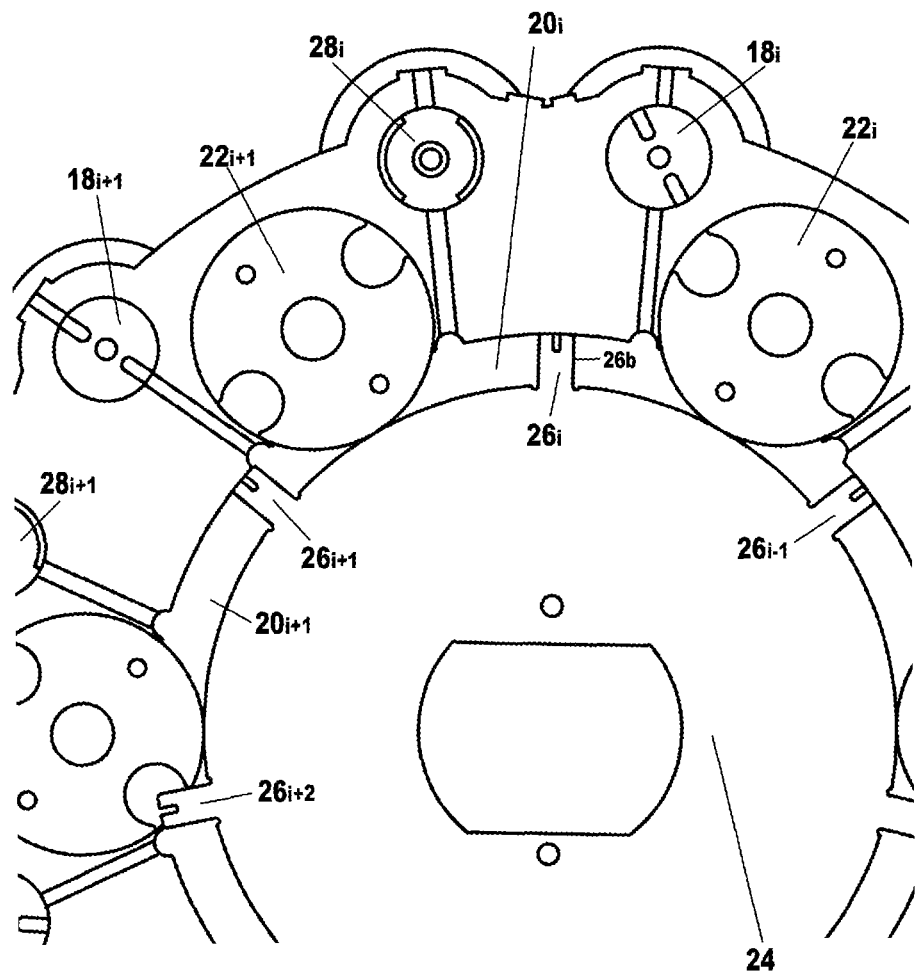

FIG. 2B shows primary inlet valve $18_i$ closed, after admitting a batch of supercritical process fluid 30 of predetermined volume into expansion chamber $20_i$. On entering the expansion chamber the batch of process fluid has transformed from a liquid or super-critical state into gas or steam, which pushes on the backside 26b of rotor blade $26_i$ in a counter clockwise direction. At the same time primary outlet valve $28_i$ is completely open allowing the batch of gas or steam from the previous batch to be connected to the cold reservoir $10_i$ and thus create a vacuum that applies on the front side 26a of the rotor blade $26_i$.

Figure 2C:
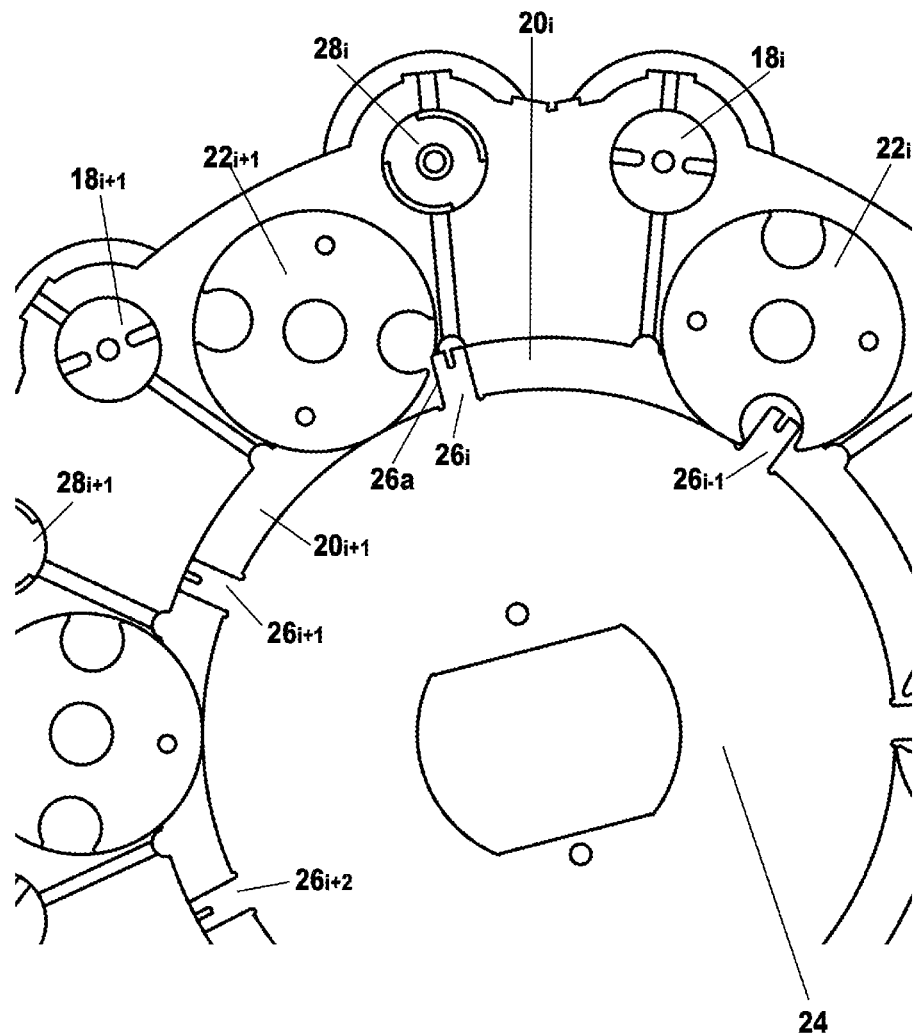

In FIG. 2C, the gas or steam phase of the process fluid continues to expand pushing rotor blade $26_i$ to the opening that connects the expansion chamber $20_i$ to primary outlet valve $28_i$. At this stage nearly all of the expanded gas or steam from the previous batch of process fluid has been pushed out of the expansion chamber $20_i$ by the front side 26a of rotor blade $26_i$ through the primary outlet valve $28_i$ and primary outlet valve $28_i$ closes. The rotor blade $26_i$ is starting to enter the recess of the small rotor $22_{i+1}$.

Figure 2D:
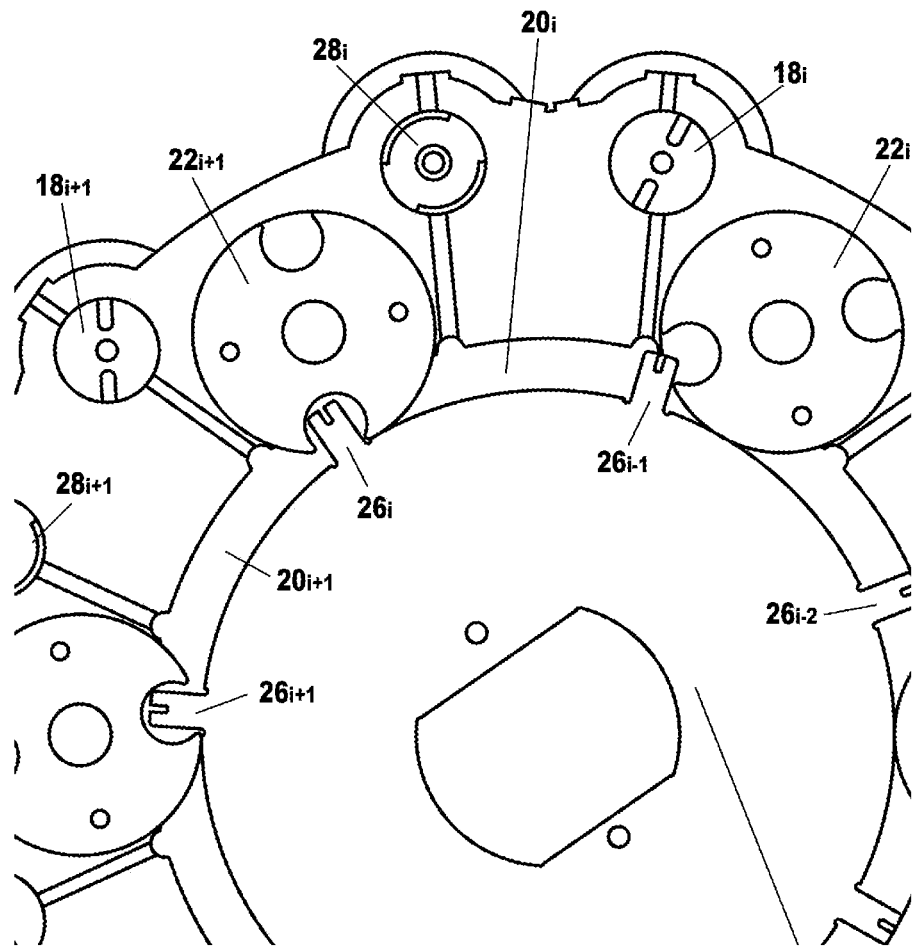

In FIG. 2D, rotor blade $26_i$ has passed primary outlet valve $28_i$ and has entered a recess in small rotor $22_{i+1}$ on its way into expansion chamber $20_{i+1}$. Rotor blade $26_{i-1}$ has passed through small rotor $22_i$ and has now entered expansion chamber $20_i$ and both primary entrance valve $18_i$ and primary exit valve $28_i$ are closed trapping the fully expanded gas or steam phase from the previous batch of process fluid in expansion chamber $20_i$.

Figure 2E:
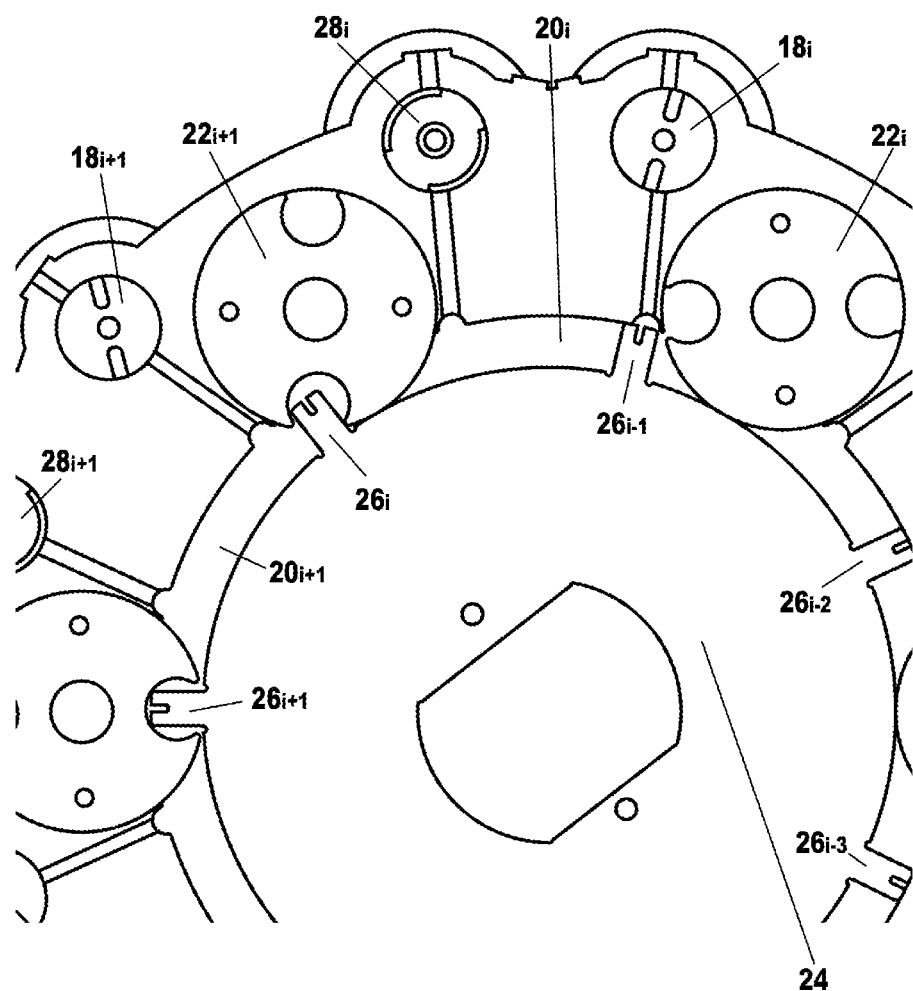

In FIG. 2E main rotor 24 continues to rotate and rotor blade $26_{i-1}$ is aligned with the inlet to expansion chamber $20_i$. Primary inlet valve $18_i$ and primary outlet valve $28_i$ have almost been rotated to their open configurations.

Figure 2F:
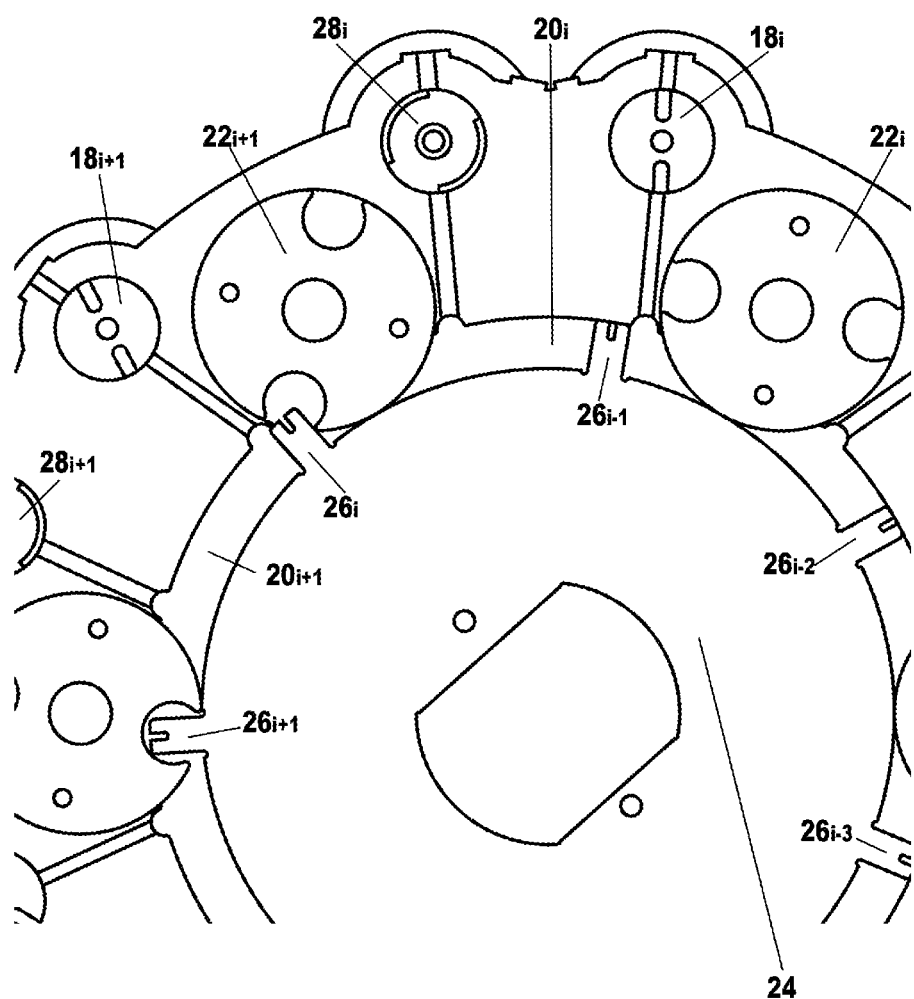

FIG. 2F shows the moment immediately before a new cycle is started. Rotor blade $26i$ has passed through the small rotor $22i_{+1}$ that has already closed the expansion chamber $20i_{+1}$. The small amount of expanded gases that pass through the recess of the small rotor $22i_{+1}$ into the expansion chamber $20i_{+1}$ help the rotor blade $26_i$ to move until its backside has reached the inlet of inlet valve $18_{i+1}$ without creating a counter-productive vacuum.

The next moment is the start of a new cycle and is identical to FIG. 2A. At this stage primary inlet valve $18_i$ is open to allow a new batch of supercritical process fluid to enter process chamber $20_i$ to the right of rotor blade $26_{i-1}$ and primary outlet valve $28_i$ is opening to allow the fully expanded gas or steam phase from the previous batch of process fluid, which is still confined in expansion chamber $20_i$ between rotor blades $26_{i-1}$ and small rotor $22_{1+1}$ to be connected to the cold reservoir and thus create a vacuum that applies on the front side of the following rotor blade $26_{i-1}$.

The pressure that the pump 12 applies on the process fluid, the temperature to which the process fluid is heated by the heater system 14, the precise amount of overheated pressurised process fluid that the inlet valve 18 allows to pass into the expansion chamber 20, and the minimal and maximal volume of the expansion chamber are all chosen relative to each other to optimise the efficiency of the primary process of the engine system.

The basic calculations for pressures, temperatures and volumes are the same as for steam engines and thus common knowledge.

If the engine is not sufficiently insulated against heat losses then it may be necessary or an advantage to calculate the complete expansion volume not just from the inlet $18i$ to the outlet $28i$ but up to the next inlet $18i+1$ and by this avoid pre-mature condensation during the time when the rotor blade leaves the expansion chamber through the recess in the small rotor until the primary outlet valve $18i$ opens. Good insulation of the engine however will prevent heat losses and thus also pre-mature condensation or partial condensation of the fully expanded gases in the expansion chamber.

Because the heater system is not producing steam but an overheated process fluid the process fluid has to be hotter than the nominal gas, steam or vapour temperature in order to overcome the specific evaporation heat of the process fluid. Therefore in most cases the process fluid is a supercritical-fluid. The advantage of using a supercritical fluid versus steam lays first in the size of the hot reservoir 16, the pipe diameter, and the size of the inlet valve. With a pressure of 2 MPa steam requires an 83.7 larger cross-section (of the pipes) or volume (of the heat reservoir or entrance valve) than is required for use with supercritical water. Other disadvantages of the use of steam instead of supercritical water are that the surfaces where heat losses can occur are exponentially bigger and the flow behaviour of a liquid has advantages when compared to pressurised steam, gas or vapour because it cannot create swinging or line sway, also with a liquid pressure peaks can be easily controlled, preferably in the hot reservoir that would then also function as a pressure buffer. With an engine in which the flow is interrupted by the inlet valves the latter advantage is important.

When the pressurised overheated process fluid reaches the expansion chamber and transforms into a gas, steam, or vapour (depending on the process fluid), the gas, steam or vapour applies pressure on all walls of the expansion chamber. Because only the rotor blade 26 is movable, the pressure that is applied on the back surface $26b$ of the rotor blade 26 leads to the movement of the rotor blade 26 and as the rotor blade 26 moves it turns the main rotor 24 and thus the thermal energy of the process fluid is translated into kinetic energy. As the rotor blade 26 moves the volume of the expansion chamber increases, and the pressure of the gas, steam or vapour decreases in indirect proportion to the increase in volume. At the maximal expansion, when the rotor blade 26 has reached the outlet opening with the outlet valve 28 the gas, steam or vapour is completely expanded but still in a gaseous state as designed.

As opposed to most engines, the primary outlet valve 28 in the engine of the invention is closing—not opening—when the rotor blade 26 reaches the outlet opening. The rotor blade 26 then continues to move with the rotation of the main rotor caused by the process being carried out in other expansion chambers of the engine. As the rotor blade 26 passes the primary outlet valve 28, it passes through the recess or opening in the small rotor 22 and thus leaves the expansion chamber. Because the gas, steam or vapour is already expanded, there is only a very small amount of it that also leaves the expansion chamber through the recess in the small rotor 22. This small amount of expanded gases allows the rotor blade to move into the next expansion chamber without creating a vacuum.

At the exact same time, when the rotor blade $26_i$ is leaving the expansion chamber the following next rotor blade $26_{i+1}$ is starting to enter the expansion chamber that is still filled with the expanded gas, steam or vapour of the previous work-cycle at the other side. The outlet valve 28 is still closed at this stage. The primary outlet valve 28 opens when the following rotor blade passes the inlet valve 18, which is opening and thus starting the next work-cycle with the expansion of the next batch of overheated supercritical process fluid. The completely expanded gas, steam or vapour is thus then connected through the open outlet valve 28 to the cold reservoir 10 through a channel that could be a pipe or hose or just an opening, integrated into the housing. The fluid in the cold reservoir 10 is below the evaporation temperature of the gas, steam or vapour and thus there is a low pressure or vacuum inside the cold reservoir that is sucking the gas, steam or vapour from the expansion chamber. A heat exchanger 30 that takes a part of the heat energy of the warm condensed process fluid can be used to preheat the fuel of the heater system and at the same time help reduce the temperature of the gas entering the cold reservoir thus preventing the cold reservoir from heating up too much over time. In such a case the use of a heat exchanger 30 in the cold reservoir 10 would keep the energy that is taken out of the cold reservoir 10 inside the engine system by re-introducing it at the heater system 14.

An additional vacuum is then created by the completely expanded gases or steam reaching the cold surface of the heat exchanger 30 between the primary outlet valve 28 and the cold reservoir 10 and thus condensing into a fluid. The volume of completely expanded steam—as an example—is reduced by a factor of about one thousand six hundred fifty seven (1,657) when it undergoes transformation from the gas to the liquid state. Because the outlet valve 28 had been closed until the start of the next work-cycle when the next rotor blade reaches the position behind the inlet valve, the vacuum is directed to the front side $26a$ of the rotor blade 26 and thus acts in each work-cycle on the front side $26a$ (see FIG. 1) of the rotor blades. By closing and opening the outlet valve accordingly, the vacuum of the cold reservoir is only connected to the expansion chamber when it can contribute to create kinetic energy by applying a negative pressure on the front-side $26a$ of the rotor-blade. At all other times the cold reservoir and with it the low pressure or vacuum is disconnected from the expansion chamber by the outlet valve in closed position.

By using the vacuum of the condensation inside the expansion chamber in front of the rotor blade 26 not only the pressure difference is used but additionally also at least a large part of the evaporation enthalpy or condensation enthalpy that would otherwise be lost is also used to create kinetic energy of the rotor.

The engine concept of the invention, as described herein for the primary process, can use nearly all the energy that is generated by the heater system and stored in the pressurised overheated process fluid until complete expansion and complete condensation of the process fluid. Thus the closed work-cycle of the invention can reach a high efficiency, even when the primary process is realised at lower temperatures where—as described herein above—the percentage of the energy that is needed for evaporation of the process fluid is significant higher than for processes with higher end temperatures.

By using a pressurised process fluid and overheating it already at the heater system instead of producing a gas, steam or vapour, as it is done in the Rankine cycle and Clausius-Rankine cycle, the volume of the overheated pressurised or supercritical process fluid stays small. As an example steam at 0.2 MPa pressure would have a volume that is 80 times larger than that of the same mass of supercritical pressurised overheated water. Because the volume of process fluid is small, both the recess in the inlet valve 18 and the rotating inlet valve itself can be kept small. Thus it is possible to arrange without difficulty several expansion chambers serially, i.e. one next the other, and to provide a very compact engine, thereby saving material and significantly increasing the power per mass ratio of the engine.

The engine of the invention with its primary process can be realised with several expansion chambers in serial arrangement, one expansion chamber next to the other arranged as a disk in the same geometric plane. A single expansion chamber delivers a decreasing force on the rotor blade during a single work-cycle and thus a decreasing force on the engine shaft. If there are several expansion chambers in series, then the forces transmitted to the engine shaft are more evenly distributed than with just one or two expansion chambers.

It is also possible to build the engine with a configuration comprised of several parallel disks, wherein each disk comprises a rotor and several expansion chambers arranged as discussed herein above and the rotor of each of the discs is connected to a common output shaft. This configuration might be advantageous especially when bigger engines are built. This arrangement of serial and parallel expansion chambers allows the engine to be run with one or more discs shut off to compensate for fluctuations in the energy-content of the fuel or of the power consumption of the consumer, e.g. the electrical grid, or to increase the precision of the output energy by using it for pulse-pause modulation. Also for start-up of the engine this arrangement could be useful because each disk and even each expansion chamber can work independently from the others.

The primary process of this invention reaches a very high efficiency by using all the energy that is stored in the overheated pressurised process fluid. By adjusting the inlet valve 18 to the precise amount of overheated pressurised process fluid that is necessary to completely expand in the expansion chamber 20 and by using the outlet valve 28 to synchronise the condensation with the expansion of the following work-cycle an optimum transformation of heat energy into kinetic energy is achieved.

The correct synchronisation of the inlet-valve 18 and the outlet valve 28 can easily be realised by connecting these rotating valves with the properly selected gears connected to the main shaft. For example, for the embodiment shown in the FIG. 2A to FIG. 2F the gear translation is 3.5:1 from the main shaft to the inlet primary valve 18 and the primary outlet valve 28.

The Secondary Process

Because it is designed to work at optimum efficiency, the primary process has no power reserve. Especially when the engine is being operated to drive a generator for the electrical grid a sudden increase in power-demand—often in the form of a sudden drop of the frequency—occurs and is transferred through the generator into the engine. Without any reserve an engine based only on the primary process could stall.

Figure 3A:
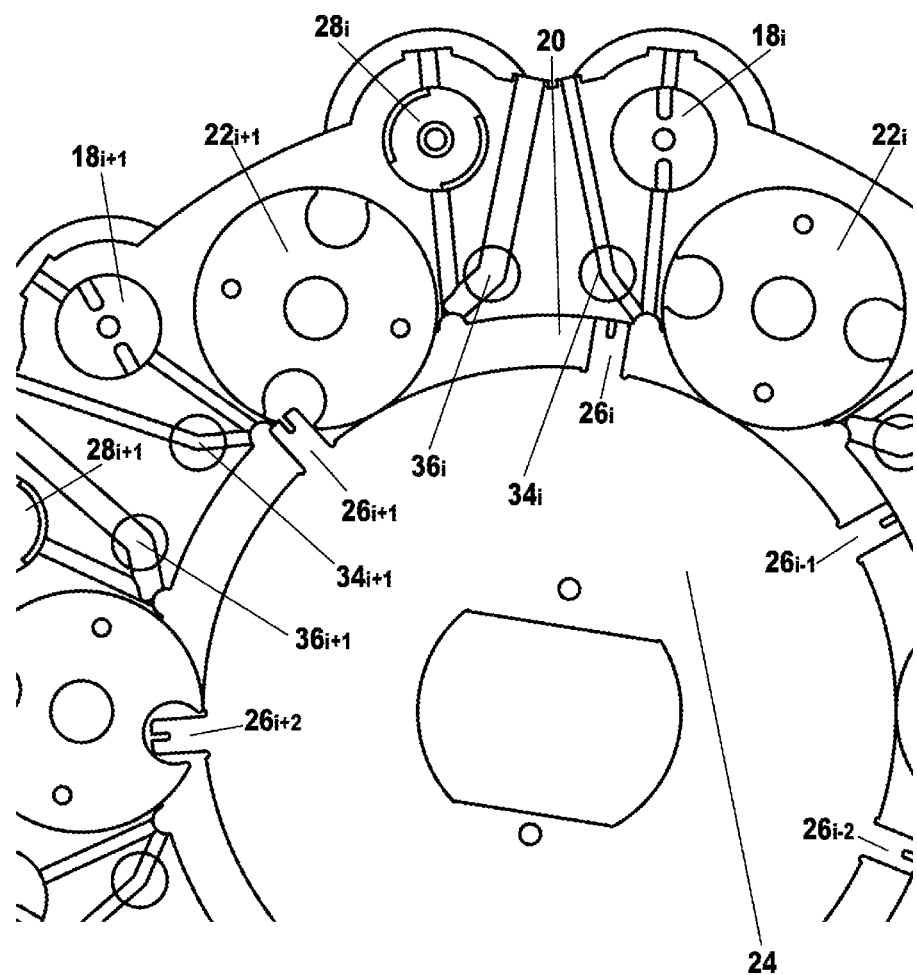
FIGS. 3A and 3B schematically show the arrangement of the primary and secondary inlet valves and primary and secondary outlet valves of an expansion chamber in an engine of the invention.
Figure 3B:
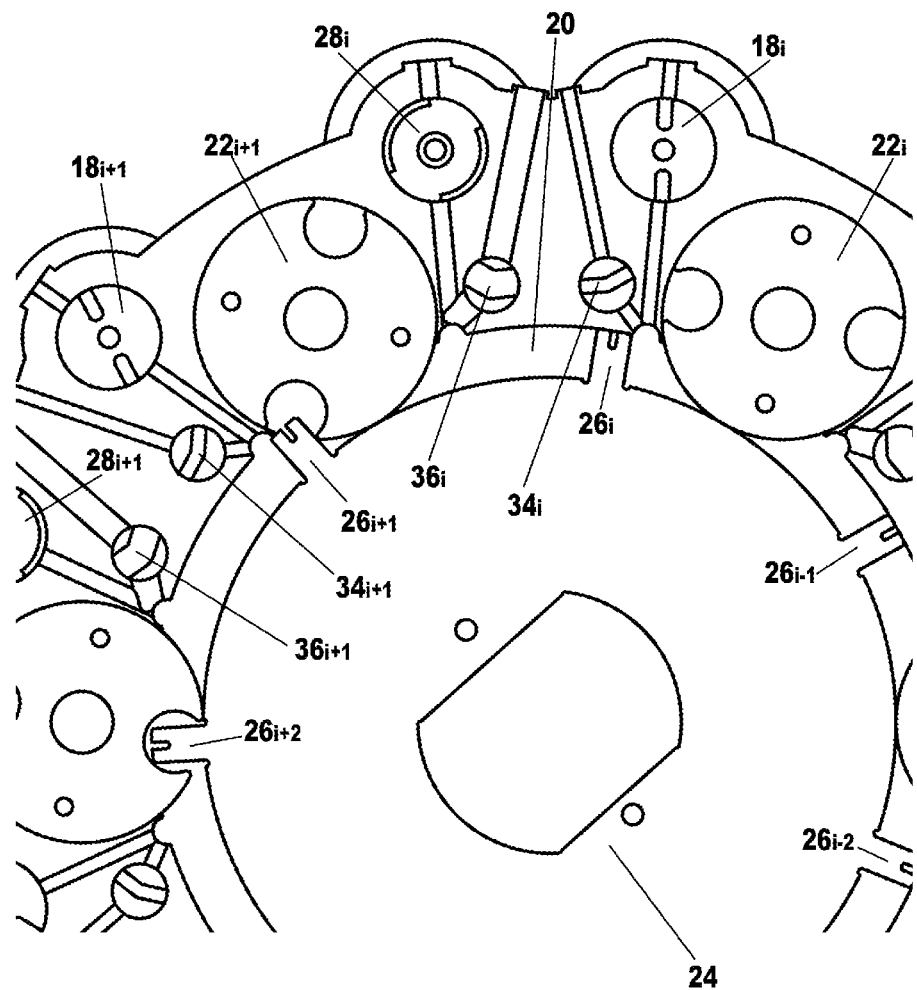

By adding to each expansion chamber at least one additional secondary inlet valve and at least one additional secondary outlet valve it is possible to perform a secondary process parallel to the primary process at the same time and in the same engine part, i.e. expansion chamber, when the primary process is working. FIGS. 3A and 3B schematically show the arrangement of the primary and secondary inlet valves and primary and secondary outlet valves of an expansion chamber in an engine of the invention. The inlets and outlets of the primary and secondary processes are aligned roughly in parallel at the same circumferential position relative to the closing mechanisms to optimize the space needed for them.

The inlet valve 34 into each expansion chamber 10 is in addition to the inlet valve 18 of the primary process into the same expansion chamber. The valves of the primary and secondary processes are opened and closed independently of each other. They admit process fluid from both processes into the expansion chamber at the same location and allow expanded gas to escape from the expansion chamber at the same location.

FIG. 3A shows the secondary inlet valves 34 and the secondary outlet valves 36 open. In FIG. 3B these valves are shown closed. The secondary inlet valve 34 and secondary outlet valve 36 are not connected to, or synchronised with the main shaft as are the inlet valve 18 and outlet valve 28 of the primary process.

In many, but possibly not all, uses for the engine of this invention the addition of the secondary process might is useful or even necessary. In a situation in which, for example, the engine of this invention is used as a stationary power-generator engine and due to a sudden increase of power demand on the electrical grid some reserve power is necessary to prevent the engine from stalling, these additional secondary valves 34 could be opened to allow additional overheated pressurised process fluid into the expansion chambers. In contrast to the primary process where only a precise amount of process fluid is let into the expansion chamber at the beginning of a work cycle, the secondary inlet valve 34 or valves can let in overheated pressurised process fluid as long as they remain open. Because the amount of the gas, steam or vapour that is present is now much larger than with the small amount that the inlet valve of the primary process allows to enter the expansion chamber, it is useful to have also at least one secondary outlet valve 36 with an adequate cross section to allow the at least partly expanded gases of the secondary process to leave the expansion chamber 20.

With the secondary process additional pressure and thus forces are created inside the expansion chambers 20 that are manifested as pressure on the rotor-blades 26 and thus as additional force on the main shaft. This additional force is used as a reserve for the engine that would otherwise—without the secondary process—be without any reserve and thus unstable. If the secondary process were carried out in a separate additional engine part, i.e. expansion chamber, the secondary process might not be able to provide the necessary reserve because the expansion chamber would be cold and thus the overheated pressurised fluid cannot work as it could in an already hot engine. With engines of small size this problem might be insignificant, but with large engines in which the thermal expansion of cold parts can be on the order of millimeters when the parts reach operating temperature, the problem does matter. Therefore it is a great advantage to use the already heated expansion chambers of the primary process also for the secondary process.

The secondary inlet valve 34 can be connected to the hot reservoir 16 of the primary process. If the secondary process is only used for few seconds—for example if there is a sudden power demand on an electrical grid as described in the example above—then the amount of additional overheated pressurised process fluid required is not large, because such a power drop usually lasts less than one or two seconds. Accordingly the secondary outlet valve 36 could then be connected to the cold reservoir 10.

Also other concepts are possible, where the secondary process has its own cold reservoir, its own heater-system and its own hot reservoir. This can be for each single expansion chamber or it can also be for several expansion chambers together as the utilisation of the condensation is not of great importance for the small time of use of the secondary process and thus the separation of each work-cycle is not as important as it is for the primary process.

The secondary process does not reach a high efficiency. Because the secondary process is designed only to help the primary process in situations where stalling of the engine could otherwise occur, the secondary process will only be used from time to time. If in the example of the sudden power demand in an electric-power-grid, there were such situations twice a day, each lasting for two seconds, then the secondary process is used just 0.0025% of the time that the primary process is operating. Even this small usage however can be of vital importance to prevent a blackout of an electrical grid. Thus the secondary process enables the use of the highly efficient but instable primary process for electricity generation.

The secondary process could also be used for a faster heating up of large engines that run using the primary process of this invention. The higher amount and thus higher mass of overheated pressurised process fluid introduced into the expansion chambers by the secondary process would lead to a significantly faster heating up of the engine mass. A well-defined and controlled heat-up procedure of larger engines is necessary because with bigger engines the thermal expansion of parts is in the range of millimeters while in smaller engines it is smaller than the clearances between moving parts (usually around 0.02 to 0.05 mm) and thus can be ignored.

The engine of this invention is activated by a pressurised and overheated process fluid that changes in the inlet of the expansion chamber from a liquid state to a gaseous state. In order to attain a specific pressure of this gas, steam or vapour formed from the transformation process at this specific point in the inlet of the expansion chamber, a specific temperature of the process fluid at this specific location—in the entrance of the expansion chamber—is necessary. Also it is necessary to add the additional energy that is necessary to transform the process fluid from the fluid into the gaseous state. This additional energy is called the latent heat of vaporisation and it does not contribute to a rise in temperature. When the gas at a later stage transforms back to a liquid state this energy is released again as condensation-enthalpy, or enthalpy of condensation. As explained in the Background section herein above this energy is not released as heat and this is the reason that the Rankine process or Clausius-Rankine process that are used today for most engines that work with a heated process fluid are operated at the highest possible starting temperature to keep the percentage of the amount of the (lost) heat of vaporisation as low as possible.

As described above the primary process of the present invention is able to transform not only the heat energy of the pressurised hot gas, steam or vapour of the process fluid but also the condensation enthalpy into kinetic energy. Thus the process and engine system of this invention can also be used for processes wherein a process fluid is heated only to a relative low temperature and the process and engine-system will still have an efficiency of above 50%. This is very important, for example, enabling the use of solar technology on an inexpensive low-tech level to heat a process fluid.

Because the engines of this invention can operate efficiently at low temperatures, it is feasible to produce such engines with sufficient precision from common thermoplastic material. If necessary, the stiffness and stability of the thermoplastic parts can be reinforced by metal and or ceramic material—either as an inlay during the extrusion process or afterwards as cast or solids parts. This would allow mass production of inexpensive engines with high efficiency.

Although embodiments of the invention have been described by way of illustration and in particular that a specific design of the rotary engine is described herein it will be understood by skilled persons that many variations of the basic engine design are possible allowing the invention to be carried out with many variations, modifications, and adaptations, without exceeding the scope of the claims.

The invention claimed is:

1. A rotary engine system comprised of at least one independent partial engine configured to perform a primary process of transforming thermal energy into kinetic energy, each partial engine comprising:
  A) a cold reservoir comprising a heat exchanger in which gas phase process fluid condenses to the liquid state;
  B) a pump adapted to pressurize the process fluid in its liquid state received from the cold reservoir;
  C) a heater system adapted to receive pressurized process fluid in liquid form from the pump and to heat the process fluid;
  D) a hot reservoir adapted to store pressurized and overheated process fluid received from the heater system;
  E) an expansion chamber having an entrance side and an exit side, the expansion chamber adapted to allow rotor blades to move through the expansion chamber, the rotor blades attached to a main rotor, wherein the main rotor is attached to an output shaft of the rotary engine system;
  F) two closing mechanisms that define the entrance side and the exit side of the expansion chamber, wherein the first of the closing mechanisms is located before a primary inlet opening that allows process fluid to enter the expansion chamber and the second of the closing mechanisms is located after a primary outlet opening that allows expanded gases of the process fluid to exit the expansion chamber; the closing mechanisms being adapted to trap batches of process fluid within the expansion chamber while allowing the rotor blades to pass into and out of the expansion chamber;
  G) a primary inlet valve in fluid communication with the primary inlet opening of the expansion chamber, the primary inlet valve configured to receive overheated pressurized process fluid from the hot reservoir and to allow a series of batches of overheated pressurized process fluid of predetermined volume to enter the expansion chamber; and
  H) a primary outlet valve in fluid communication with the primary outlet opening of the expansion chamber and adapted to allow the gas phase of the process fluid to leave the expansion chamber and to return to the heat exchanger in the cold reservoir, wherein the gas phase process fluid is cooled and condensed to the liquid state;

wherein:
i) the primary inlet valve is configured as a rotating feeding valve that comprises at least one recess having a predetermined volume that is adapted to receive pressurized and overheated process fluid in liquid form from the hot reservoir, to allow the pressurized and overheated process fluid to enter the expansion chamber in discrete batches, and to physically separate each batch of process fluid in liquid form from the expansion chamber thereby preventing the batches of process fluid in liquid form from starting to expand and evaporate until rotation of the primary inlet valve allows fluid communication between the interior of the recess and the primary inlet opening of the expansion chamber, thereby preserving all of the thermal energy contained within each batch of pressurized process fluid in the form of heat and pressure to be released only inside the expansion chamber;
ii) the opening and closing of the closing mechanisms, of the primary inlet valve and of the primary outlet valve are mechanically synchronized with the rotation of the main rotor thereby enabling feeding batches of liquid process fluid into the expansion chamber in synchronization with the rotational speed of the rotary engine system—one batch per one rotor blade passing through the expansion chamber;
iii) the primary inlet valve and the primary outlet valve are both configured to close when the rotor blade nears the circumferential end of the expansion chamber thus enclosing and trapping the expanded gases of the process fluid within the expansion chamber;
iv) the primary inlet valve is configured such that its rotational position immediately after a first rotor blade passes through the closing mechanism at the exit side of the expansion chamber and the following second rotor blade passes through the closing mechanism at the entrance side of the expansion chamber allows a new second batch of liquid process fluid to enter the expansion chamber where it begins expanding and pushing the second rotor blade forwards while the expanded gases of the previous first batch of process fluid are still in the remaining volume of the expansion chamber in front of the second rotor blade;
v) the primary outlet valve is configured to open not before the second batch of process fluid starts to enter the expansion chamber thereby, connecting the expansion chamber to the cold reservoir and defining a hermetically closed space composed of the part of the expansion chamber in front of the second rotor blade, the heat exchanger, and a connecting passage from the primary outlet valve to the heat exchanger; whereby condensation in the heat exchanger of the expanded gases from the first batch of process fluid that are in the expansion chamber in front of the second rotor blade generates a vacuum, which creates a negative pressure on the front of the second rotor blade and thus adds to the force on the second rotor blade in the forward direction.

2. The rotary engine system of claim 1 comprising more than one partial engine, wherein the expansion chambers of said partial engines are located one next to the other distributed around the circumference of said rotary engine system.

3. The rotary engine system of claim 1 wherein the heater system comprises a burner adapted to allow quasi continuous burning of fluids at temperatures high enough to ignite the fluids by using controlled continuous pulsing explosions or detonations.

4. The rotary engine system of claim 1 wherein the heater system comprises a solar heater.

5. The rotary engine system of claim 1 wherein the closing mechanisms are one of small rotors and radially moving flaps.

6. The rotary engine system of claim 1 comprising a configuration comprised of several parallel disks, wherein each disk comprises a rotor and several partial engines, wherein the expansion chambers of each of said partial engines are located one next to the other distributed around the circumference of said rotor and wherein the rotors of all of said disks are connected to a common output shaft.

7. The rotary engine system of claim 1 wherein each expansion chamber comprises at least one secondary inlet valve in fluid communication with a secondary inlet opening into said expansion chamber and at least one secondary outlet valve in fluid communication with a secondary outlet opening into said expansion chamber, thereby making it possible to perform a secondary process parallel to the primary process at the same time and in the same expansion chamber.

8. The rotary engine system of claim 7 wherein the primary and secondary inlet openings are aligned at the same circumferential position relative to the closing mechanisms, and the primary and secondary outlet openings are aligned at the same circumferential position relative to the closing mechanisms, to optimize the space needed for the primary and secondary inlet and outlet openings and to admit process fluid from both processes into the expansion chamber at the same location and to allow expanded gas to escape from the expansion chamber at the same location.

9. The rotary engine system of claim 7 wherein the secondary inlet valve and secondary outlet valve are not connected to or synchronized with the primary inlet valve, the primary outlet valve, or the main rotor, and said secondary inlet and outlet valves are configured to be opened and closed independently of the primary inlet and outlet valves.

10. The rotary engine system of claim 1 wherein a portion of said rotary engine system is made from thermoplastic material.

11. A closed, circulating primary process to transform thermal energy into kinetic energy in a rotary engine system, said rotary engine system comprised of at least one independent partial engine configured to perform the primary process, each partial engine comprising:
A) a cold reservoir comprising a heat exchanger in which condensation of a process fluid from the gas phase to the liquid state is initiated;
B) a pump adapted to pressurize the process fluid in its liquid state received from the cold reservoir;
C) a heater system adapted to receive pressurized process fluid in liquid form from the pump and to heat the process fluid;
D) a hot reservoir adapted to store pressurized and overheated process fluid received from the heater system;
E) an expansion chamber having an entrance side and an exit side, the expansion chamber adapted to allow rotor blades to move through the expansion chamber, the rotor blades attached to a main rotor, wherein the main rotor is attached to an output shaft of the rotary engine system;

F) a first closing mechanism that defines the entrance side of the expansion chamber with a primary inlet opening located after said first closing mechanism, said primary inlet opening allowing process fluid to enter the expansion chamber;

G) a second closing mechanism that defines the exit side of the expansion chamber with a primary outlet opening located before said second closing mechanism, said primary outlet opening allowing expanded gases of the process fluid to exit the expansion chamber;

wherein, both closing mechanisms are configured to trap batches of process fluid within the expansion chamber and both closing mechanisms are configured to allow the rotor blades to pass in and out of the expansion chamber;

H) a primary inlet valve in fluid communication with the primary inlet opening of the expansion chamber, the primary inlet valve configured as a rotating feeding valve that comprises at least two recesses each having a predetermined volume that is adapted to receive pressurized and overheated process fluid in liquid form from the hot reservoir, to allow the pressurized and overheated process fluid to enter the expansion chamber in discrete batches, and to physically separate each batch of process fluid in liquid form from the expansion chamber thereby preventing the batches of process fluid in liquid form from starting to expand and evaporate until rotation of the primary inlet valve allows fluid communication between the interiors of the recess and the expansion chamber; and I) a primary outlet valve in fluid communication with the primary outlet opening of the expansion chamber and adapted to allow the gas phase of the process fluid to leave the expansion chamber and to return to the heat exchanger in the cold reservoir, wherein the gas phase process fluid is cooled thereby causing and initiating condensation of the process fluid from the gaseous state to the liquid state; wherein, the opening and closing of the closing mechanisms, of the primary inlet valve and of the primary outlet valve of each independent partial engine are mechanically synchronized with the rotation of the main rotor;

each cycle of the closed, circulating primary process comprising the following steps:

i) activating the pump to suck the process fluid in its liquid state from the cold reservoir, to pressurize the liquid process fluid, and to force the liquid process fluid to stream to the heater system;

ii) heating the pressurized liquid process fluid in the heater system, thereby increasing the amount of thermal energy stored in the process fluid;

iii) storing heated pressurized liquid process fluid received from the heater system in the hot reservoir;

iv) advancing the continuous rotation of the primary inlet valve thereby establishing fluid communication between the hot reservoir and a first recess in the primary inlet valve, thereby filling the first recess with a first batch of pressurized and overheated process fluid in liquid form received from the hot reservoir;

v) advancing the continuous rotation of the primary inlet valve further, thereby interrupting fluid communication with the hot reservoir;

vi) advancing the continuous rotation of the primary inlet valve further until fluid communication is established between the recess filled with the first batch of pressurized and overheated process fluid in liquid form and the primary inlet opening of the expansion chamber;

vii) releasing the first batch of pressurized and overheated process fluid in liquid form from the recess in the primary inlet valve into the expansion chamber thereby causing the first batch of pressurized and overheated process fluid to flash evaporate inside the expansion chamber, thereby changing the first batch of pressurized and overheated process fluid from the liquid state to the gaseous state, wherein the flash evaporation is immediately followed by expansion of the gaseous process fluid;

viii) advancing the continuous rotation of the primary inlet valve thereby establishing fluid communication between the hot reservoir and a following recess in the primary inlet valve, thereby filling the following recess with a second batch of pressurized and overheated process fluid in liquid form received from the hot reservoir;

ix) exerting a forward directed force on the back side of a first rotor blade by means of the expanded and expanding gases, thereby pushing the first rotor blade continuously through the expansion chamber, thereby changing the thermal energy into kinetic energy;

x) closing both the primary inlet valve and the primary outlet valve when the expansion of the gases have pushed the first rotor blade to the circumferential end of the expansion chamber where the front side of the rotor blade nearly reaches the primary outlet valve thus enclosing and trapping the expanded gases of the process fluid within the expansion chamber;

xi) allowing a second rotor blade to pass through the closing mechanism that defines the entrance side of the expansion chamber while both the continuously rotating primary inlet valve and the primary outlet valve remain closed and the expansion chamber is filled with the trapped expanded gas phase of the first batch of process fluid;

xii) allowing the second rotor blade to pass the continuously rotating primary inlet valve while the continuously rotating inlet valve is still in a position that prevents fluid communication between the following recess in the primary inlet valve and the expansion chamber and the primary outlet valve is still in a closed position thus keeping the expanded gases from the expanded gas phase of the first batch of process fluid trapped in the expansion chamber in front of the second rotor blade;

xiii) advancing the continuous rotation of the primary inlet valve further until fluid communication is established between the recess filled with the second batch of pressurized and overheated process fluid in liquid form and the primary inlet opening of the expansion chamber;

xiv) releasing the second batch of pressurized and overheated process fluid in liquid form from the recess in the primary inlet valve into the expansion chamber thereby causing the second batch of pressurized and overheated process fluid to flash evaporate inside the expansion chamber, thereby changing the second batch of pressurized and overheated process fluid from the liquid state to the gaseous state, wherein the flash evaporation is immediately followed by expansion of the gaseous process fluid;

xv) opening the primary outlet valve not before the release of the second batch of pressurized and overheated process fluid in liquid form from the recess in the primary inlet valve into the expansion chamber, thereby enabling the flash evaporation of the second batch of process fluid in the expansion chamber to take place at the same time as the opening of the primary outlet valve;

xvi) defining by the opening of the outlet valve a hermetically closed space composed of the part of the expansion chamber in front of the second rotor blade, the heat exchanger, and a connecting passage from the primary outlet valve to the heat exchanger;

xvii) returning the trapped expanded gases from the first batch of process fluid to the heat exchanger in the cold reservoir through the hermetically closed space;

xviii) initiating condensation of the first batch of process fluid from the gaseous state to the liquid state in the heat exchanger, whereby condensation in the heat exchanger of the expanded gases in the hermetically closed space in front of the second rotor blade generates a vacuum, which creates a negative pressure on the front side of the second rotor blade;

xix) extracting energy from the expanded gases from the first batch of process fluid that passes through the heat exchanger during its condensation and using this extracted energy for pre-heating fuel of the heater system and process fluid;

wherein:

the recesses in the primary inlet valve preserve all of the thermal energy contained within each batch of pressurized process fluid in the form of heat and pressure that is released only inside the expansion chamber and enable feeding batches of liquid process fluid into the expansion chamber synchronized with the rotational speed of the rotary engine system—one batch of liquid process fluid per one rotor blade passing through the expansion chamber.

12. The process according to claim 11 adapted to further perform a secondary process, wherein the rotary engine system additionally comprises, in at least one expansion chamber in at least one independent partial engine in the rotary engine system, at least one secondary inlet valve in fluid communication with the hot reservoir and the expansion chamber and at least one secondary outlet valve in fluid communication with the primary outlet opening of the expansion chamber; the secondary process comprising:

providing, on demand, an additional volume of process fluid in liquid state to the expansion chamber through the secondary inlet valve, wherein the secondary inlet valve is configured to operate in parallel to the primary inlet valve, thereby producing additional force on the back side of a rotor blade; and exhausting the additional volume of process fluid in its gaseous state from the expansion chamber through the secondary outlet valve;

thereby providing a mechanism that overrides the limitation on the primary inlet valve to always provide only the exact same amount of overheated pressurized process fluid in liquid form and thus always generating only the same amount of force on a rotor blade thus limiting the risk that in certain situations a power demand may cause stalling of the rotary engine system or inability to initiate start-up of the rotary engine system.

13. The process of claim 12 wherein the secondary process is initiated to prevent stalling of the primary process.

14. The process of claim 12 wherein the secondary process is initiated during the start-up process of said rotary engine system.

* * * * *